United States Patent
Stern et al.

(10) Patent No.: US 11,096,389 B2
(45) Date of Patent: Aug. 24, 2021

(54) ALKANOLAMINE SULFATE WATER CONDITIONERS

(71) Applicant: Indorama Ventures Oxides LLC, The Woodlands, TX (US)

(72) Inventors: Alan J Stern, Magnolia, TX (US); Matthew T Meredith, Spring, TX (US)

(73) Assignee: Indorama Ventures Oxides LLC, The Woodlands, TX (US)

( * ) Notice: Subject to any disclaimer, the term of this patent is extended or adjusted under 35 U.S.C. 154(b) by 81 days.

(21) Appl. No.: 15/305,124

(22) PCT Filed: Sep. 16, 2015

(86) PCT No.: PCT/US2015/050330
§ 371 (c)(1),
(2) Date: Oct. 19, 2016

(87) PCT Pub. No.: WO2016/057170
PCT Pub. Date: Apr. 14, 2016

(65) Prior Publication Data
US 2017/0202215 A1   Jul. 20, 2017

Related U.S. Application Data

(60) Provisional application No. 62/061,929, filed on Oct. 9, 2014.

(51) Int. Cl.
| | | |
|---|---|---|
| A01N 25/02 | (2006.01) | |
| A01N 37/40 | (2006.01) | |
| A01N 39/02 | (2006.01) | |
| A01N 39/04 | (2006.01) | |
| A01N 43/40 | (2006.01) | |
| A01N 57/20 | (2006.01) | |
| A01N 25/30 | (2006.01) | |

(52) U.S. Cl.
CPC ............ *A01N 25/02* (2013.01); *A01N 25/30* (2013.01); *A01N 37/40* (2013.01); *A01N 39/04* (2013.01); *A01N 43/40* (2013.01); *A01N 57/20* (2013.01)

(58) Field of Classification Search
None
See application file for complete search history.

(56) References Cited

U.S. PATENT DOCUMENTS

| | | |
|---|---|---|
| 3,716,351 A | 2/1973 | Kunkel |
| 3,948,632 A | 4/1976 | Ritchey |
| 5,202,037 A | 4/1993 | Lavelle et al. |
| 8,236,730 B2 | 8/2012 | Bramati et al. |
| 8,809,234 B1 | 8/2014 | Parrish |
| 2009/0186767 A1* | 7/2009 | Arbogast ............... A01N 37/04 504/313 |
| 2011/0009269 A1 | 1/2011 | Gioia et al. |
| 2012/0142532 A1 | 6/2012 | Wright et al. |
| 2012/0329651 A1 | 12/2012 | Dave et al. |
| 2013/0274106 A1 | 10/2013 | Ikeda |

FOREIGN PATENT DOCUMENTS

| | | |
|---|---|---|
| WO | 1992/012637 A | 8/1992 |
| WO | 2012/104237 | 8/2012 |

OTHER PUBLICATIONS

USGS, https://pubs.usgs.gov/of/1978/0200/report.pdf, 1978, p. 25. (Year: 1978).*
PubChem—Compound Summary for CID 71435870—Bis[bis ammonium]sulphate; create date May 22, 2013, access late Nov. 16, 2015; p. 3, 5.
Extended European Search report dated Mar. 13, 2018, for patent application No. 15848869.2, 5 pages.
B. E. May, R. S. Hestand, and J. M. Van Dyke, Comparative Effects of Diquat plus Copper Sulfate on Aquatic Organisms, Weed Science, 1973, vol. 21, Issue 3, pp. 249-253.
Uzbekskii Khimicheskii Zhurnal, 1983, No. 1, pp. 58-64.

* cited by examiner

*Primary Examiner* — Alton N Pryor

(57) ABSTRACT

Embodiments of the present disclosure include an agricultural composition containing an agriculturally active ingredient and a water conditioning agent. The water conditioning agent is an alkanolammonium sulfate. Embodiments of the present disclosure further include a method of conditioning water while maintaining comparable volatility in an agricultural formulation by adding at least one water conditioning agent to an agriculturally active ingredient, wherein the water conditioning agent comprises at least one alkanolamine sulfate.

13 Claims, No Drawings

ALKANOLAMINE SULFATE WATER CONDITIONERS

CROSS-REFERENCE TO RELATED APPLICATIONS

This application is the National Phase of International Application PCT/US2015/050330 filed Sep. 16, 2015 which designated the U.S. and which claims priority to U.S. App. Ser. No. 62/061,929 filed Oct. 9, 2014. The noted applications are incorporated herein by reference.

FIELD OF THE INVENTION

The present disclosure relates generally to water conditioning agents that do not increase the volatility of pesticides, and in particular, alkanolammonium sulfates and their uses in agricultural compositions.

BACKGROUND

Water conditioning agents are widely used to increase the efficacy of pesticides. A traditional water conditioning agent is diammonium sulfate, commonly known as "AMS." The biggest use of AMS is in combination with the herbicide glyphosate, which is quite sensitive to water hardness. Hard water ions such as calcium, magnesium, iron and the like reduce the efficacy of glyphosate by binding to it and thereby rendering it inactive. Using a water conditioning agent such as AMS reduces the amount of hard water ions that may bind with glyphosate.

Although AMS is cheap and effective, it is known to increase the volatility of herbicides, such as dicamba and 2,4-dichlorophenoxyacetic acid (2,4-D). In many cases, glyphosate will be combined with other herbicides such as dicamba, 2,4-D or other synthetic auxin herbicides in the spray tank dilution before application.

Volatility is a negative consequence that occurs after the application of the herbicide onto the area/plants to be treated. A herbicide with greater volatility is more likely to evaporate/vaporize from the desired application area and become airborne. The wind may then carry the herbicide to other areas/plants that were not intended to be treated. Therefore, the volatility of herbicides is undesirable because of the potential for damage to crops or other vegetation adjacent to the site of initial herbicide application.

BRIEF SUMMARY OF THE INVENTION

Thus, there is a need for water conditioners that preserve the efficacy of herbicides but do not result in a more volatile herbicide formulation.

Embodiments of the present disclosure include an agricultural composition that contains at least one agriculturally active ingredient and at least one water conditioning agent that is an alkanolammonium sulfate.

Embodiments of the present disclosure further include a method of conditioning water while maintaining comparable volatility of an agriculturally active ingredient in an agricultural formulation comprising adding at least one water conditioning agent to an agriculturally active ingredient, in some embodiments blended with moderate, hard or very hard water, wherein the water conditioning agent comprises at least one alkanolammonium sulfate.

DETAILED DESCRIPTION OF THE INVENTION

Embodiments of the present disclosure disclose an agricultural composition that includes at least one agriculturally active ingredient; and at least one water conditioning agent that is an alkanolammonium sulfate.

Embodiments of the present disclosure include at least one agriculturally active ingredient. In some embodiments, the agriculturally active ingredient is a herbicide. In other embodiments the agriculturally active ingredient is an auxin, including without limitation, a synthetic auxin herbicide. Synthetic auxin herbicides may include, without limitation, 3,6-dichloro-2-methoxybenzoic acid (dicamba) and its salts, 2,4-D acid and its salts, [(4-amino-3,5-dichloro-6-fluoro-2-pyridinyl)oxy]acetic acid (fluroxypyr acid) and its salts, and combinations thereof.

In other embodiments, the agriculturally active ingredient may be a phenoxy herbicide such as 2-methyl-4-chlorophenoxyacetic acid (MCPA) acid and its salts, and methylchlorophenoxypropionic acid (MCPP) acid and its salts, 4-(4-chloro-2-methylphenoxy)butanoate (MCPB) and salts thereof and combinations thereof.

In other embodiments, the agriculturally active ingredient may be a pyridine carboxylic acid such as 3,5,6-trichloro-2-pyridinyloxyacetic (triclopyr) acid and its salts, 3,6-dichloro-2-pyridinecarboxylic (clopyralid) acid and its salts, 4-amino-3,5,6-trichloro-2-pyridinecarboxylic (picloram) acid and its salts, 3,7-dichloro-8-quinolinecarboxylic acid (quinclorac) and its salts, and combinations thereof.

In other embodiments, the agriculturally active ingredient may be N-(phosphonomethyl) glycine (glyphosate) and salts thereof, 4-[hydroxyl(methyl)phosphinoyl]-DL-homoalanine (glufosinate) ammonium or other salts, and combinations thereof.

The above agriculturally active ingredients may be used alone or in combination with one another. The terms "its salts" and "salts thereof" refer to neutralized forms of the active ingredient acids that may be neutralized with various counter ions or species such as sodium or potassium. One skilled in the art will recognize other appropriate agriculturally active ingredients to use in embodiments of the present disclosure.

In other embodiments, the agriculturally active ingredient is blended with either soft, moderate, hard or very hard water. Water described as "hard" is high in dissolved minerals, for example, calcium and magnesium. The degree of hardness becomes greater as the calcium and magnesium content increases. Hardness of water, as defined by the U.S. Geological Survey, is described as follows:

| Water | Water hardness, expressed as $CaCO_3$, in mg/L* |
|---|---|
| Soft | 0-60 |
| Moderate | 61-120 |
| Hard | 120-180 |
| Very Hard | More than 180 |

*Water hardness as $CaCO_3$ (mg/L) = 2.5 [$Ca^{2+}$ (mg/L)] + 4.5 [$Mg^{2+}$ (mg/L)]

Embodiments of the present disclosure further include a water conditioning agent composition that includes at least one alkanolammonium sulfate. The alkanolammonium sulfate includes sulfates described by Formula I.

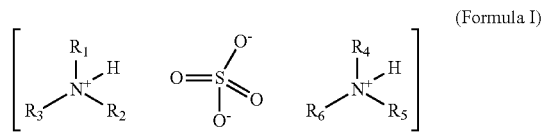

(Formula I)

wherein $R_1$, $R_2$, $R_3$, $R_4$, $R_5$ and $R_6$ are each independently a radical of formula:

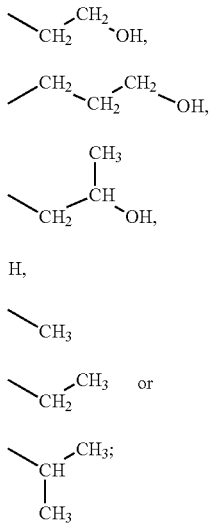

(i)
(ii)
(iii)
(iv)
(v)
(vi)
(vii)

wherein at least one of $R_1$, $R_2$, and $R_3$ and at least one of $R_4$, $R_5$ and $R_6$ is the radical of formula (i), (ii) or (iii).

Examples of suitable alkanolammonium sulfates also include di(2-hydroxyethylammonium sulfate) (a.k.a. "MEA sulfate"), di(bis-(2-hydroxyethyl)ammonium sulfate) (a.k.a. "DEA sulfate"), di(tris-(2-hydroxyethyl)ammonium sulfate) (a.k.a. "TEA sulfate"), di(2-hydroxylethoxyethyl-ammonium sulfate), and combinations thereof.

Alkanolammonium sulfates suitable for use in embodiments of the present disclosure may also include alkanolammonium sulfate salts as described in Formula II.

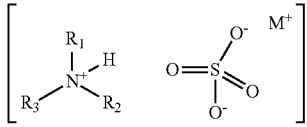

(Formula II)

wherein M is a sodium (Na), potassium (K) or any other an atom or group of atoms that is capable of a cationic charge, and wherein $R_1$, $R_2$ and $R_3$ are each independently a radical of formula:

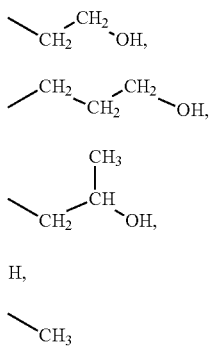

(i)
(ii)
(iii)
(iv)
(v)
(vi)
(vii)

wherein at least one of $R_1$, $R_2$, and $R_3$ is the radical of formula (i), (ii) or (iii).

Suitable alkanolammonium sulfate salts may include potassium alkanolammonium sulfates such as potassium hydroxyethylammonium sulfate, potassium tris(2-hydroxylethyl)ammonium sulfate and combinations thereof.

Other possible alkanolammonium sulfates may include hydroxyethylmorpholine (HEM) sulfate, aminoethylethanolammonium (AEEA) sulfate, diglycolammonium (DGA) sulfate, N-methylethanolammonium sulfate, N,N-dimethylethanolammonium sulfate, N-methyldiethanolammonium sulfate, 3-hydroxypropanolammonium sulfate, and combinations thereof. HEM Sulfate, AEEA sulfate and DGA sulfate are represented below:

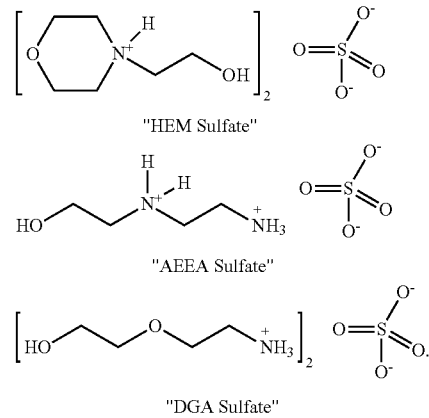

"HEM Sulfate"

"AEEA Sulfate"

"DGA Sulfate"

All of the listed alkanolammonium sulfates may be used alone or in combination with one another.

The alkanolammonium sulfates of the present disclosure may be reaction products of at least one alkanolamine and at least one acid. In an embodiment of the present disclosure, the alkanolamine may be a monoethanolamine, diethanolamine, triethanolamine, diglycolamine, aminoethylethanolamine, hydroxyethylmorpholine, N,N-Bis-(3-aminopropyl)methylamine and combinations thereof. In an embodiment, the at least one acid is sulfuric acid. One skilled in the art would recognize other suitable acids that would react with an alkanolamine to form alkanolammonium sulfate. In another embodiment, a mixture of two or more different alkanolamines is reacted with sulfuric acid.

Embodiments of the agricultural compositions of the present disclosure may also include one or more additives. Additives may include agricultural spray or tank adjuvants, surfactants (for e.g. fatty amine ethoxylates), dispersants, anti-drift agents, humectants, anti-freeze agents, wetting agents, stickers, thickening agents and antifoam agents. One skilled in the art, with the benefit of this disclosure, will recognize other appropriate additives to use depending on the use and application of the agricultural composition.

The water conditioner agents disclosed herein may be incorporated into a pesticide formulation thus providing "built in" water conditioning, or, provided as a standalone water conditioning adjuvant formulation without a pesticide component, or provided as part of a multifunctional adjuvant formulation without a pesticide component. These formulations are typically concentrates and would be used by simply adding the desired amount of concentrate to the tank/spray mixture prior to application.

Agriculture compositions of the present disclosure may include spray or tank mixes. These mixes are typically single or combinations of multiple agricultural products that a consumer, such as a farmer, would pour into a tank, add water and perhaps other adjuvants/additives, mix and then spray/apply on the field. These mixes are typically are prepared close to the field to which the material is to be applied.

The use rate of these water conditioning agents in a tank/spray mixture is similar to that of AMS, i.e. from about 0.05 to about 3.0% on a weight (based on solids) to volume basis (w/v). In other embodiments, the water conditioning agents are used from about 0.1 to about 2.0% w/v. Embodiments of the present disclosure further comprise a method of conditioning water while maintaining comparable volatility of an agriculturally active ingredient of an agricultural composition by adding at least one water conditioning agent to an agriculturally active ingredient, in some embodiments blended with moderate, hard or very hard water, wherein the water conditioning agent comprises at least one alkanolammonium sulfate. By "comparable" it is meant that the agriculturally active ingredient volatility does not substantially increase or decrease when tested by the Thermogravimetric Analyzer (TGA) method. Embodiments of the present disclosure further include methods of applying the agricultural compositions disclosed herein to plants and soils.

Advantages of embodiments of the present disclosure include that the water conditioning agents described herein have the attribute that they do not significantly increase the volatility of the agricultural compositions in contrast to traditional water conditioning agents that contain ammonium ($NH_4$) ions.

Embodiments of the present disclosure will be further illustrated by a consideration of the following examples, which are intended to be exemplary of the disclosure.

EXAMPLES

Example 1: Preparation of Monoethanolamine (MEA) Sulfate Water Conditioner 208 grams of MEA, was placed in a 1 liter metal beaker and placed in a water-ice bath. Using an overhead mixer, 350 grams of 50% sulfuric acid in water was added slowly, keeping the temperature of the mixture below 60° C. The result is a yellow solution of MEA sulfate, 69% in water having a pH of 6.45.

Preparation of all other alkanolammonium sulfate water conditioners are done by a similar procedure. Mixed salts containing a monovalent metal cation and an alkanolammonium ion such as potassium 2-hydroxylethylammonium sulfate are also easily prepared by a similar procedure. In this case, the molar ratio of metal cation to alkanolammonium ion can vary between 0.1:1.0 and 1.0:0.1.

Example 2: Preparation of a Mixed Alkanolammonium Sulfate Water Conditioner

In an ice bath, one mole (98 grams) of sulfuric acid was carefully added to ice water (98 grams) in a glass beaker with continuous gentle mixing. When the temperature of this mixture had fallen to 10° C., triethanolamine (74.5 grams, 0.5 moles) was carefully added with stirring. Next, monoethanolamine (30.5 grams, 0.5 moles) was carefully added with stirring. The pH of the solution, measured at 1% concentration in deionized water, was 6.0.

Example 3: A Comparison of the Increase in Auxin Herbicide Volatility with Various Water Conditioning Agents A comparison of the increase in auxin herbicide volatility in various water conditioning agents was done by preparing mixtures of water, herbicide (dicamba diglycolamine (DGA) salt in this case), and water conditioning agent. Concentration of the solutions mimics actual agricultural field-use concentrations. In this test, done using thermogravimetric analysis (TGA), a comparison was made between a control (dicamba-DGA alone) to dicamba-DGA plus a water conditioning agent. The results in Table 1 show that the alkanolammonium sulfate water conditioners of this disclosure effectively suppress the volatility of dicamba compared to the traditional water conditioner AMS that contains simple ammonium ions. Furthermore, the TGA results in Table 1 show that alkylammonium sulfates, represented by di(isopropylammonium) sulfate (IPA sulfate in the chart), behave similarly to AMS, and cause an increase in dicamba volatility. The agricultural compositions with alkanolammonium sulfates exhibit preferred volatility characteristics.

TABLE 1

TGA Comparison of Dicamba plus Water Conditioners

| Dicamba Mixture | Relative Volatility | Comments |
|---|---|---|
| Dicamba-DGA | 0.01185 | Dicamba- DGA volatility baseline. |
| Dicamba-DGA + AMS | 0.02155 | AMS is the industry standard water conditioner for glyphosate; however, it causes a huge increase in dicamba volatility. |
| Dicamba + IPA Sulfate | 0.01655 | The IPA sulfate, which is not an alkanolammonium sulfate of this disclosure, was found to increase dicamba volatility similar to AMS. |
| Dicamba + MEA Sulfate | 0.01200 | Alkanolammonium sulfates of this disclosure do not cause an increase in dicamba volatility. |
| Dicamba + TEA Sulfate | 0.0071 | |

Example 4. Compatibility with Glyphosate Herbicide Solution

A mixture of 950 grams water containing 1000 ppm calcium, 30 grams of the MEA sulfate solution from Example 1, and 20 grams of ROUNDUP ULTRA® MAX herbicide (The Scotts Company LLC of Marysville, Ohio) was prepared. The result was a clear, homogenous solution, demonstrating that the new water conditioner is physically and chemically compatible with glyphosate-containing formulations.

Example 5. Water Conditioning Effect with Glyphosate

A field trial was conducted to compare the efficacy of the herbicide glyphosate (diluted to less than its label use rate with distilled water or water containing 1000 ppm (calcium+ magnesium)), with or without water conditioning agents of the present disclosure. In this trial, the glyphosate-containing spray was applied to flax, amaranth, sunflower and corn. The glyphosate used in this field trial was Touchdown® HT herbicide and its spray application rate was kept constant at 9.6 fl oz/a. A non-ionic surfactant (Activator 90 surfactant) was also applied with the herbicide at a constant spray application rate of 0.5% v/v. Finally, the water conditioning agents of the present disclosure, when present, were applied at spray application rates of 0.75% v/v and 1.0% v/v. Flax, amaranth, sunflower and corn, which had been plotted at various locations throughout the field, were spray treated and visually assessed on a particular day after treatment for injury on a scale of 0 to 100%, with zero representing "no" injury and 100% representing "complete" injury or death. The water conditioning agents tested during this trial included:

Sulfate 1=monoethanolamine sulfate (70% solution in water);
Sulfate 2=triethanolamine sulfate (70% solution in water); and
Sulfate 3=a mixed potassium and monoethanolamine sulfate (25% solution in water).

The results are provided below:

TABLE 2

% Control Of Flax

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| Distilled water | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 109 | | 45 | 45 |
| Non-ionic surfactant | 213 | | 50 | 50 |
| Sulfate 1 (0.75% v/v) | 311 | | 60 | 60 |
| | | Mean | 51.7 | 51.7 |
| Glyphosate (Hard Water) | 110 | | 55 | 60 |
| Non-ionic surfactant | 202 | | 60 | 65 |
| Sulfate 2 (0.75% v/v) | 306 | | 55 | 65 |
| | | Mean | 56.7 | 63.3 |
| Glyphosate (Hard Water) | 111 | | 60 | 65 |
| Non-ionic surfactant | 205 | | 60 | 65 |
| Sulfate 3 (0.75% v/v) | 310 | | 60 | 60 |
| | | Mean | 60 | 63.3 |

TABLE 2A

% Control Of Flax

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 114 | | 55 | 55 |
| Non-ionic surfactant | 203 | | 45 | 45 |
| Sulfate 1 (1.0% v/v) | 313 | | 45 | 45 |
| | | Mean | 48.3 | 48.3 |
| Glyphosate (Hard Water) | 115 | | 55 | 50 |
| Non-ionic surfactant | 216 | | 50 | 55 |
| Sulfate 2 (1.0% v/v) | 302 | | 50 | 50 |
| | | Mean | 51.7 | 51.7 |
| Glyphosate (Hard Water) | 116 | | 55 | 55 |
| Non-ionic surfactant | 206 | | 55 | 55 |
| Sulfate 3 (1.0% v/v) | 314 | | 45 | 45 |
| | | Mean | 51.7 | 51.7 |

TABLE 3

% Control Of Amaranth

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 109 | | 75 | 75 |
| Non-ionic surfactant | 213 | | 75 | 75 |
| Sulfate 1 (0.75% v/v) | 311 | | 68 | 68 |
| | | Mean | 72.7 | 72.7 |
| Glyphosate (Hard Water) | 110 | | 65 | 65 |
| Non-ionic surfactant | 202 | | 65 | 65 |
| Sulfate 2 (0.75% v/v) | 306 | | 70 | 65 |
| | | Mean | 66.7 | 65 |
| Glyphosate (Hard Water) | 111 | | 95 | 90 |
| Non-ionic surfactant | 205 | | 95 | 90 |
| Sulfate 3 (0.75% v/v) | 310 | | 90 | 90 |
| | | Mean | 93.3 | 90 |

TABLE 3A

% Control Of Amaranth

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 114 | | 80 | 70 |
| Non-ionic surfactant | 203 | | 80 | 70 |
| Sulfate 1 (1.0% v/v) | 313 | | 85 | 75 |
| | | Mean | 81.7 | 71.7 |
| Glyphosate (Hard Water) | 115 | | 70 | 70 |
| Non-ionic surfactant | 216 | | 65 | 65 |
| Sulfate 2 (1.0% v/v) | 302 | | 70 | 70 |
| | | Mean | 68.3 | 68.3 |
| Glyphosate (Hard Water) | 116 | | 70 | 70 |
| Non-ionic surfactant | 206 | | 70 | 70 |
| Sulfate 3 (1.0% v/v) | 314 | | 68 | 68 |
| | | Mean | 69.3 | 69.3 |

TABLE 4

% Control Of Sunflower

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 109 | | 70 | 70 |
| Non-ionic surfactant | 213 | | 75 | 75 |
| Sulfate 1 (0.75% v/v) | 311 | | 68 | 68 |
| | | Mean | 71 | 71 |
| Glyphosate (Hard Water) | 110 | | 65 | 65 |
| Non-ionic surfactant | 202 | | 65 | 65 |
| Sulfate 2 (0.75% v/v) | 306 | | 70 | 70 |
| | | Mean | 66.7 | 66.7 |
| Glyphosate (Hard Water) | 111 | | 95 | 95 |
| Non-ionic surfactant | 205 | | 95 | 95 |
| Sulfate 3 (0.75% v/v) | 310 | | 88 | 90 |
| | | Mean | 92.7 | 93.3 |

TABLE 4A

% Control Of Sunflower

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 114 | | 85 | 80 |
| Non-ionic surfactant | 203 | | 85 | 80 |
| Sulfate 1 (1.0% v/v) | 313 | | 85 | 80 |
| | | Mean | 85 | 80 |
| Glyphosate (Hard Water) | 115 | | 70 | 70 |
| Non-ionic surfactant | 216 | | 68 | 68 |
| Sulfate 2 (1.0% v/v) | 302 | | 70 | 70 |
| | | Mean | 69.3 | 69.3 |
| Glyphosate (Hard Water) | 116 | | 68 | 68 |
| Non-ionic surfactant | 206 | | 55 | 55 |
| Sulfate 3 (1.0% v/v) | 314 | | 58 | 58 |
| | | Mean | 60.3 | 60.3 |

TABLE 5

% Control Of Corn

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 109 | | 68 | 80 |
| Non-ionic surfactant | 213 | | 70 | 80 |
| Sulfate 1 (0.75% v/v) | 311 | | 68 | 78 |
| | | Mean | 68.7 | 79.3 |
| Glyphosate (Hard Water) | 110 | | 75 | 75 |
| Non-ionic surfactant | 202 | | 70 | 75 |
| Sulfate 2 (0.75% v/v) | 306 | | 75 | 75 |
| | | Mean | 73.3 | 75 |
| Glyphosate (Hard Water) | 111 | | 93 | 99 |
| Non-ionic surfactant | 205 | | 95 | 99 |
| Sulfate 3 (0.75% v/v) | 310 | | 93 | 99 |
| | | Mean | 93.7 | 99 |

TABLE 5A

% Control Of Corn

| Treatment | Plot No. | | % Control 2 Weeks Post Treatment | % Control 4 Weeks Post Treatment |
|---|---|---|---|---|
| Glyphosate (Dist. Water) | 101 | | 50 | 55 |
| Non-ionic surfactant | 207 | | 60 | 60 |
| | 301 | | 50 | 55 |
| | | Mean | 53.3 | 56.7 |
| Glyphosate (Hard Water) | 104 | | 30 | 30 |
| Non-ionic surfactant | 215 | | 35 | 35 |
| | 305 | | 35 | 35 |
| | | Mean | 33.3 | 33.3 |
| Glyphosate (Hard Water) | 114 | | 80 | 88 |
| Non-ionic surfactant | 203 | | 75 | 85 |
| Sulfate 1 (1.0% v/v) | 313 | | 78 | 85 |
| | | Mean | 77.7 | 86 |
| Glyphosate (Hard Water) | 115 | | 80 | 90 |
| Non-ionic surfactant | 216 | | 80 | 90 |
| Sulfate 2 (1.0% v/v) | 302 | | 78 | 85 |
| | | Mean | 79.3 | 88.3 |
| Glyphosate (Hard Water) | 116 | | 75 | 75 |
| Non-ionic surfactant | 206 | | 65 | 70 |
| Sulfate 3 (1.0% v/v) | 314 | | 65 | 70 |
| | | Mean | 68.3 | 71.7 |

The results demonstrate that the addition of the inventive water conditioning agents to the glyphosate/non-ionic surfactant spray mixture significantly improves the % control of all vegetation tested when compared against the glyphosate/non-ionic surfactant spray mixture control. This indicates the capability of the inventive water conditioning agents to preserve the efficacy of the agriculturally active ingredient while at the same time reducing/preventing its volatility in the spray mixture.

Those skilled in the art will appreciate that the invention described herein is susceptible to variations and modifications other than those specifically described. It is to be understood that the invention includes all such variations and modifications which fall within its spirit and scope. The invention also includes all the steps, features, compositions and compounds referred to or indicated in this specification, individually or collectively, and any and all combinations of any two or more of said steps or features.

What is claimed is:

1. An agricultural composition consisting of:
at least one agriculturally active ingredient; and
at least one water conditioning agent blended in water wherein the water conditioning agent comprises an alkanolammonium sulfate acid and/or a sodium or potassium alkanolammonium sulfate, one or more additives selected from water a fatty amine ethoxylate, an anti-drift agent, a humectant, an anti-freeze agent, a sticker, a thickening agent, and an anti-foam agent and a mixture thereof and wherein the agriculturally active ingredient is at least one herbicide and wherein the agriculturally active ingredient is selected from the group consisting of:

at least one synthetic auxin herbicide;

MCPA acid and its salts, MCPP acid and its salts, MCPB acid and its salts, triclopyr acid and its salts, clopyralid acid and its salts, picloram acid and its salts, quinclorac acid and its salts, and a combination thereof; and glyphosate acid and its salts, glufosinate acid and its salts, and a combination thereof.

2. The composition of claim 1, wherein the alkanolammonium sulfate is a sulfate of Formula 1:

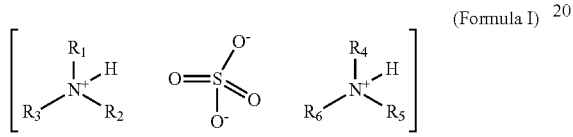
(Formula I)

wherein $R_1$, $R_2$, $R_3$, $R_4$, $R_5$ and $R_6$ are each independently a radical of formula:

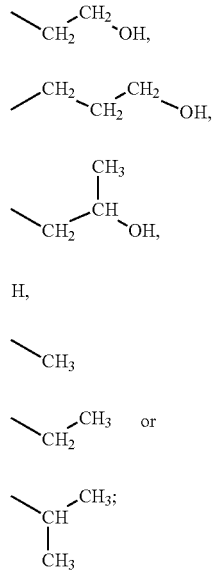

(i)
(ii)
(iii)
(iv)
(v)
(vi)
(vii)

and, wherein at least one of $R_1$, $R_2$ and $R_3$ and at least one of $R_4$, $R_5$ and $R_6$ is the radical of formula (i), (ii) or (iii).

3. The composition of claim 1, wherein the alkanolammonium sulfate is selected from the group consisting of: di(2-hydroxyethylammonium) sulfate, di(bis-(2-hydroxyethyl)ammonium) sulfate, di(tris-(2-hydroxyethyl)ammonium) sulfate, di(2-hydroxyethoxyethyleneammonium) sulfate and a combination thereof.

4. The composition of claim 1, wherein the alkanolammonium sulfate is a sulfate of Formula (II):

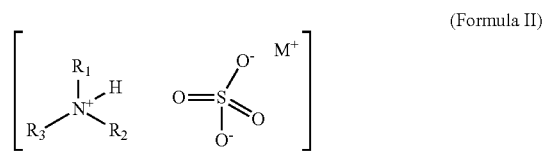
(Formula II)

wherein M is sodium or potassium, and wherein $R_1$, $R_2$ and $R_3$ are each independently a radical of formula:

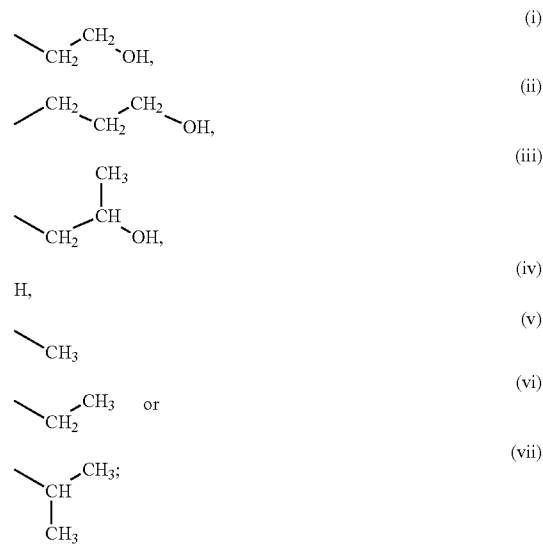

(i)
(ii)
(iii)
(iv)
(v)
(vi)
(vii)

wherein at least one of $R_1$, $R_2$ and $R_3$ is the radical of formula (i), (ii) or (iii).

5. The composition of claim 1, wherein the sodium or potassium alkanolammonium sulfate is present in the composition.

6. The composition of claim 5, wherein the potassium alkanolammonium sulfate is selected from the group consisting of: potassium hydroxyethylammonium sulphate, potassium tris(2-hydroxylethyl)ammonium sulphate and a combination thereof.

7. The composition of claim 1, wherein the alkanolammonium sulfate comprises hydroxyethylmorpholine sulfate, diglycolammonium sulfate, aminoethylethanolammonium sulfate, N-methylethanolammonium sulfate, N,N-dimethylethanolammonium sulfate, N-methyldiethanolammonium sulfate, 3-hydroxypropanolammonium sulfate or a combination thereof.

8. The composition of claim 1, wherein the at least one synthetic auxin herbicide is selected from the group consisting of: dicamba or its salts, 2, 4-dichlorophenoxyacetic acid or its salts, fluroxypyr acid or its salts, or combinations thereof.

9. The composition of claim 1, wherein the at least one agriculturally active ingredient is selected from the group consisting of: dicamba, salts thereof and a combination thereof.

10. The composition of claim 1, wherein the at least one agriculturally active ingredient is selected from the group consisting of: 2,4-dichlorophenoxyacetic acid, salts thereof and a combination thereof.

11. The composition of claim 1, further comprising a fatty amine ethoxylate.

12. A method of conditioning water while maintaining comparable volatility in an agricultural composition comprising adding at least one water conditioning agent to an agriculturally active ingredient wherein the water conditioning agent consists of at least one alkanolammonium sulfate acid and/or a sodium or potassium alkanolammonium sulfate, one or more additives selected from water a fatty amine ethoxylate, an anti-drift agent, a humectant, an anti-freeze agent, a sticker, a thickening agent, and an anti-foam agent and a mixture thereof and wherein the agriculturally active ingredient is a herbicide and wherein the agriculturally active ingredient is selected from the group consisting of:

at least one synthetic auxin herbicide;

MCPA acid or its salts, MCPP acid or its salts, MCPB acid or its salts, triclopyr acid or its salts, clopyralid acid or its salts, picloram acid or its salts, quinclorac acid or its salts, and a combination thereof, and glyphosate acid or its salts, glufosinate acid or its salts, and a combination thereof.

13. The method of claim 12, wherein the agricultural formulation is a tank mix or a spray mix.

* * * * *